Aug. 23, 1949.  F. A. SCHICK  2,479,968
AXIAL CONTACT SEAL
Filed Sept. 13, 1946
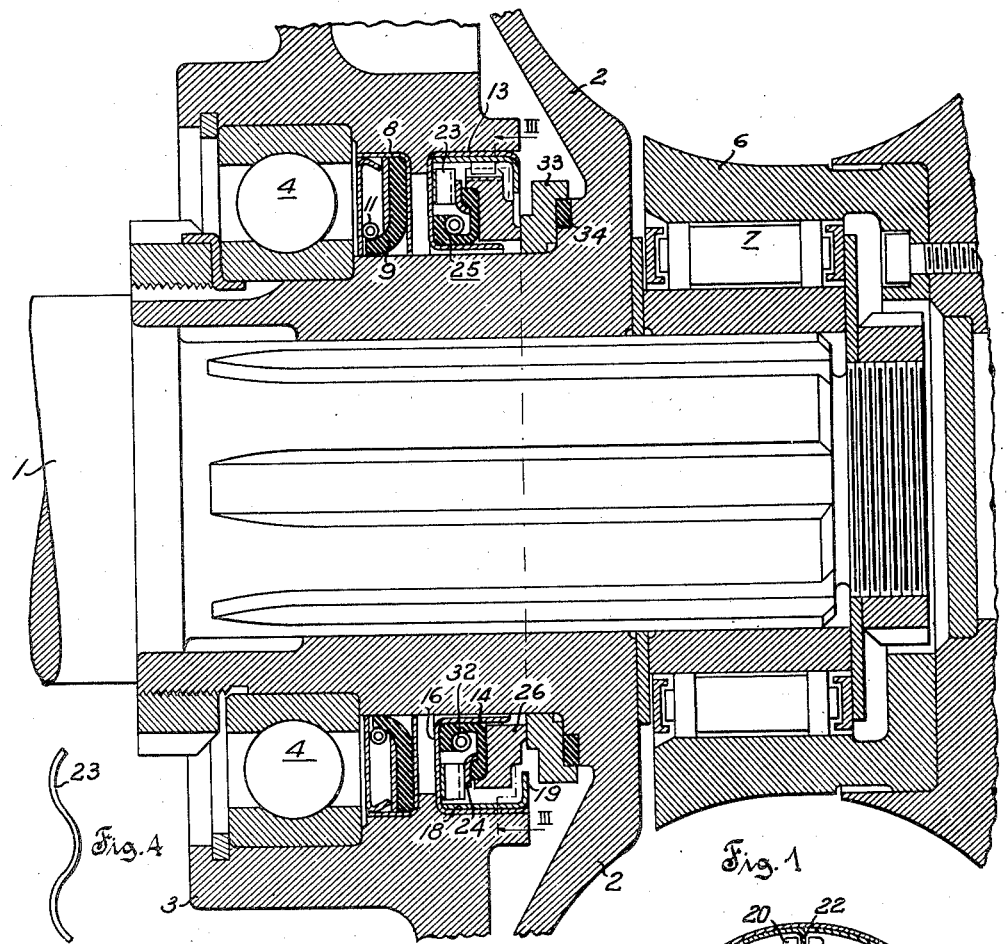
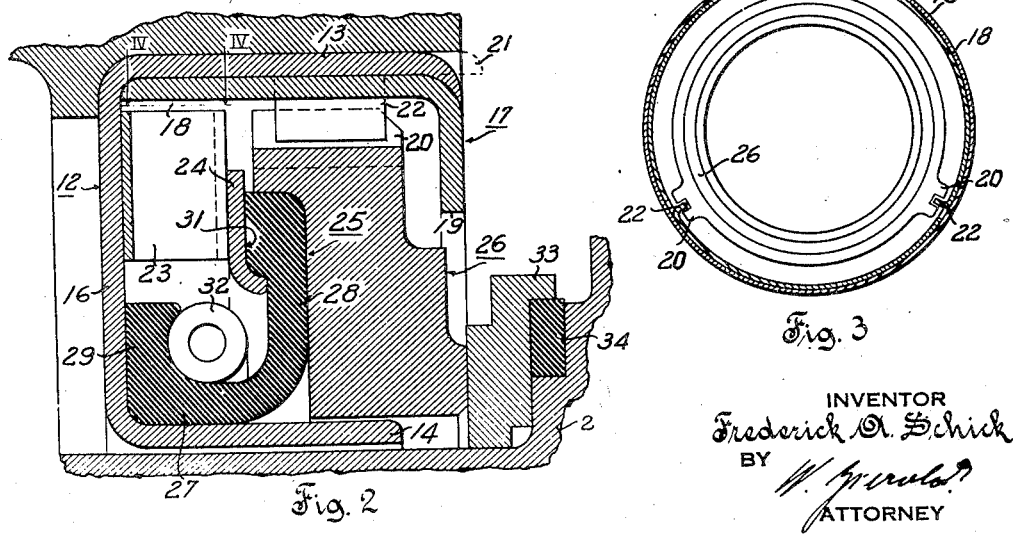
INVENTOR
Frederick A. Schick
BY
ATTORNEY Patented Aug. 23, 1949

2,479,968

UNITED STATES PATENT OFFICE 2,479,968

AXIAL CONTACT SEAL

Frederick A. Schick, Springfield, Ill., assignor to Allis-Chalmers Manufacturing Company, Milwaukee, Wis., a corporation of Delaware Application September 13, 1946, Serial No. 696,778

4 Claims. (Cl. 286—11)

This invention relates to rotary shaft seals, and it is concerned more particularly with an axial contact type of seal, that is, with a seal in which an axially shiftable sealing ring is axially urged into sealing engagement with a complementary sealing flange, and in which the sealing ring and the flange cooperate to form an annular wipe joint between a rotary shaft or the like and its supporting structure.

Seals of the hereinabove mentioned general character are well-known in the art, and it has heretofore been suggested to mount the axially shiftable sealing ring and suitable resilient backing means therefor in cooperative relation to each other within an annular sheet metal casing or shell, the object being to provide a compact preassembled seal unit which can be readily installed at the desired location for cooperation with a complementary sealing flange, and which may be removed as a unit for purposes of replacement or repair, when necessary.

In a pre-assembled seal unit of the character outlined hereinbefore it is necessary not only that the sealing ring be resiliently mounted on the sheet metal casing in axially shiftable relation thereto but also that the sealing ring be connected in fluid tight relation with said casing so that, in the completed installation, the sealing unit will be effective to prevent fluid leakage between the sealing ring and the complementary sealing flange as well as between the sealing ring and the sheet metal casing.

While constructions of pre-assembled seal units have been developed during the past which will satisfactorily function, in a completed installation, as in hydraulic apparatus, to substantially prevent fluid leakage between the sealing ring and a complementary sealing flange, the ancillary matter of providing a leak proof connection between the sealing ring and the sheet metal casing is believed to have not been taken care of in an entirely satisfactory manner by said earlier constructions. In certain instances seal failures have been experienced with such earlier constructions due to fluid leakage between the sealing ring and the sheet metal casing, and such seal failures have been particularly persistent in cases where the pre-assembled unit was installed in a hydraulic torque converter or similar hydraulic apparatus of a motor vehicle, and where the seal unit was subjected not only to relatively high pressures and temperatures but also to expansion and contraction due to alternate heating and cooling, and to other harmful influences incident to automotive service.

Generally, it is an object of the invention to provide an improved unitary seal assembly of the type outlined hereinbefore, and one in which the requirement for a leakproof connection between the casing and the sealing ring will be taken care of in an advantageous and desirable manner.

More specifically, it is an object of the invention to provide, in a unitary seal assembly of the type outlined hereinbefore, an improved form of auxiliary seal between the casing and the sealing ring, the improved form of auxiliary seal being particularly adapted for operation under the severe conditions and harmful influences to which the seal assembly becomes subjected, as mentioned hereinbefore, when it is used in a hydraulic torque converter or similar hydraulic apparatus of a motor vehicle.

A further object of the invention is to incorporate the above mentioned features of improvement in a permanently assembled seal unit of relatively few component parts; to provide a relatively simple construction of said component parts; to permit convenient arrangement of said component parts in cooperative relation to each other preparatory to permanent assembly thereof into package form; and to effect said permanent assembly of the component parts into package form in a simple, inexpensive and expeditious manner.

A further object of the invention is to provide an improved axial contact type seal unit in package form, incorporating resilient backing means for the sealing ring, and in which said resilient backing means are initially tensioned during the process of permanently assembling the component parts of the seal unit, so that said backing means will be actively preloaded in the permanently assembled unit.

These and other objects and advantages are attained by the present invention, various novel features of which will be apparent from the description herein and the accompanying drawing disclosing an embodiment of the invention, and will be more particularly pointed out in the accompanying claims.

Referring to the accompanying drawings:

Fig. 1 is a fragmentary assembly view, in section, of a bearing and seal installation in a hydraulic torque converter;

Fig. 2 is an enlarged detail view, in section, of an axial contact type seal unit shown in Fig. 1 and incorporating the invention;

Fig. 3 is a sectional end view, on a reduced scale, of the axial contact type seal unit shown in Fig. 1, Fig. 3 being a section on line III—III of Fig. 1; and Fig. 4 is a fragmentary detail view, in the direction of arrows IV—IV of Fig. 2, showing a wave spring.

Referring to Fig. 1, an input shaft 1 and a pump rotor 2 of a hydraulic torque converter are rotatably mounted in a bearing hub 3 of the torque converter housing by means of a ball bearing 4, the turbine rotor of the converter being indicated at 6 and piloted on the input shaft 1 by means of an overrunning clutch 7.

Mounted in the bearing hub 3 of the torque converter housing, at the inner side of the ball bearing 4, are two seal units, one immediately adjacent to the ball bearing 4 and the other immediately adjacent to the pump rotor 2. The first seal unit immediately adjacent to the ball bearing 4 is of the radial contact type and of conventional construction. It comprises a sheet metal casing 8 press-fitted into the bearing hub 3, a flexible sealing cuff 9 radially contacting the hub of the pump rotor 2, and a garter spring 11 urging the lip of the sealing cuff 9 into sealing engagement with the hub of the pump rotor 2.

The second seal unit immediately adjacent to the pump rotor 2 is of the axial contact type and incorporates the present invention. This seal unit is constructed as follows:

A first ring element in the form of an annular trough casing generally designated by the reference character 12 is formed of pressed sheet steel and comprises an outer circumferential wall 13, an inner circumferential wall or neck portion 14 and a radial bottom wall 16. The trough casing 12 is press-fitted into the bearing hub 3 of the converter housing, and the hub of the pump rotor 2 extends freely through the central open space defined by the inner wall 14 of the trough casing, the portion of the rotor hub surrounded by the trough casing 12 having a diameter slightly smaller than the inside diameter of the trough casing.

Telescopically fitted into the trough casing 12 is an annular retainer, generally designated by the reference character 17, which has a circumferential wall 18 radially contacting the outer wall 13 and axially contacting the bottom wall 16 of the trough casing. At the open side of the trough casing the retainer 17 has an inwardly projecting stop flange 19 for limiting axial expansion of the seal unit as will be more fully explained hereinbelow. For purposes of assembly, the trough casing 12 is originally formed to have an axially extending edge portion 21 as indicated in dotted lines in Fig. 2, and upon insertion of the retainer 17 into the trough casing 12 the edge portion 21 is peened over to securely lock the retainer 17 in fixed position within the trough casing. Three punched tongues 22 (Fig. 3) are formed on the circumferential wall 18 of the retainer 17 and said tongues are bent inwardly so as to provide radially and axially extending keys on the inner side of the retainer.

An annular wave spring 23 of the usual wave spring construction is arranged concentrically with the trough casing adjacent to the bottom wall 16 of the latter, the wave spring having four equally spaced waves, one of which is indicated in Fig. 4, and the high points of the four waves at one side of the spring axially bear upon the bottom wall 16 of the casing. The high points of the waves at the other side of the spring 23 are contacted by a thrust ring 24 which is arranged concentrically with the wave spring within the trough casing. The thrust ring 24 has a flat annular portion adjacent to its outer edge and a curved annular portion adjacent to its inner edge, the purpose of curving the thrust ring along its inner edge being to provide an axially extended portion at its inner periphery for radial locking engagement of the thrust ring with a radial flange of an annular flexible sealing member or seal boot generally designated by the reference character 25, and which will be described in fuller detail hereinbelow.

The wave spring 23 and the thrust ring 24 constitute resilient backing means for a second ring element in the form of a carbon sealing ring 26 which is telescopically mounted within the trough casing 12 in substantially concentric and axially shiftable relation thereto, the inside diameter of the sealing ring being slightly larger than the outer surface diameter of the neck portion 14 of the trough casing. At its outer circumference the sealing ring 26 is radially spaced from the axial circumferential wall portion 18 of the retainer 17, and three lugs 20 (Fig. 3) are formed at the periphery of the sealing ring and are axially slotted for the reception of the tongues 22 of the retainer 17. The tongues 22 cooperate with the slotted lugs 20 to secure the sealing ring against rotary displacement relative to the retainer 17 and thus relative to the trough casing 12, but the tongues 22 do not obstruct or limit axial shifting movement of the sealing ring relative to the trough casing.

The annular flexible sealing member or seal boot 25 which has been mentioned hereinbefore is made, preferably by moulding in one piece, of rubber-like material which will not be detrimentally affected by oil and which will tolerate heating to relatively high temperatures. The seal boot 25 is arranged in concentric relation with the trough casing 12 in the space between the bottom 16 of the latter and the sealing ring 26, and it comprises an axially extended portion or collar section 27 and a flange section 28. The collar section 27 tightly fits around the neck portion 14 of the trough casing, and integrally formed with said collar section, at the free end of the latter, is an annular peripheral bead portion 29 affording a relatively high shoulder for contact with the bottom wall 16 of the trough casing. The flange section 28 of the seal boot has another annular bead portion 31 at the side of the flange 28 facing the thrust ring 24, and the configuration of the bead 31 conforms with the plane and curved surface portions of the thrust ring 24 at the side of the latter facing the flange section 28 of the seal boot 25. Generally, the collar section 27 constitutes a radially inner portion of the annular sealing member 25, which embraces the neck portion 14, of the first ring element 12, and the flange 28 and bead 31 constitute a radially outer portion of the sealing member 25, or a radial flange portion which is axially enlarged at its outer periphery and which bears radially outwardly against an annular overhanging portion of the second ring element 26. The ring 24 constitutes an annular thrust element independent of the first and second ring elements 12, and 26, which surrounds the collar section 27 of the sealing member 25 in axially loose relation to the ring elements 12 and 16, and the curved inner part of the ring 24 provides an axially extended portion at the inner periphery of the ring 24, which bears radially outwardly against said radially outer portion of the sealing member 25. Axial engagement of the thrust ring 24 with the bead portion 31, in the assembled seal unit as shown, interlocks these two parts against radial displacement relative to each other, and it also secures the radially and axially enlarged peripheral portion of the seal boot against radial displacement relative to the sealing ring 26. The flange section 28 of the seal boot 25 bears axially and radially outwardly against an axially recessed portion of the sealing ring 26 and is thus sealingly seated on the latter.

In order to hold the collar section 27 of the seal boot 25 under substantial radial pressure against the neck portion 14 of the trough casing, annular clamping means in the form of an endless coil spring 32 is placed around the portion of the collar section 27 between the bead portion 29 and the flange section 28. The bead portion 29 is axially recessed at its side facing the coil spring 32 to provide an annular cavity for occupancy by the latter.

In the completed installation as shown in Fig. 1, the sealing ring 26 bears axially against a complementary sealing flange 33 which is mounted on the pump rotor 2 for rotation in unison with the latter. A resilient backing ring 34 of rubber-like material is operatively interposed between the sealing flange 33 and the pump rotor 2 to prevent rotation or rotary creeping of the sealing flange 33 relative to the pump rotor.

It will be noted from Figs. 1 and 2 that in the operative condition of the axial contact seal as shown in said figures, the sealing ring 26 is axially spaced an appreciable travel distance from the stop flange 19 of the retainer 17, thereby providing for axial expansion of the seal unit. The wave spring 23 is so proportioned that it will be effective in the operative condition of the seal to exert substantial axial pressure upon the sealing ring 26, through the thrust ring 24 and the flange section 28 of the seal boot 25. The relatively contacting sealing surfaces of the seal ring 26 and of the complementary sealing flange 33 are smoothly finished in conformity with established practice, to provide an annular wipe joint for rotatively sealing the pump rotor 2 relative to the housing of the torque converter. Expansion and contraction of the pump rotor, of the converter housing, of the shaft and of other parts of the converter due to alternate heating and cooling will not adversely affect the efficiency of the wipe joint, since the clearances between the sealing ring 26 and the adjacent parts of the trough casing 12 and of the retainer 17, and the resiliency of the wave spring 23, are ample to insure proper sealing engagement of the sealing ring 26 with the complementary sealing flange 33 at all times. It will further be noted that the flexible seal boot 25 is arranged in cooperative relation with the trough casing 12 and with the sealing ring 26 so as that pressure oil which may enter into the trough casing through the space between the stop flange 19 and the sealing ring 26 and which may accumulate in the space between the bottom wall 16 of the casing and the sealing ring, cannot escape from said space, because of the sealing engagement of the collar section 27 with the neck portion 14 of the casing, and because of the sealing engagement of the flange section 28 with the sealing ring 26. The seal boot 25 readily accommodates not only axial movement of the seal ring 26 relative to the trough casing but also expansion and contraction of the various parts due to alternate heating and cooling, and the seal unit will therefore not be apt to fail due to these causes.

It is usually desirable to accommodate rotary shaft seals in as short a space, axially of the shaft, as possible, and in that respect the construction of the axial contact seal unit shown in Figs. 1 and 2 is well adapted to meet existing requirements.

The axial contact type seal unit shown in Figs. 1 and 2 further readily lends itself to assembly into package form prior to its installation within the bearing hub 3 of the torque converter. As mentioned hereinbefore, the annular trough casing 12 is originally formed with a straight edge portion 21, and the annular retainer 17 may be axially fitted into the trough casing and locked in position by peening over the edge portion 21. For purposes of assembly, the wave spring 23, the thrust ring 24, the seal boot 25 with its coil spring 32 and the sealing ring 26 are telescopically moved into the trough casing to initially assume their desired cooperative relation prior to the insertion of the annular retainer 17. The coil spring 32 is placed around the collar section 27 of the seal boot 25 in the space between the bead portion 29 and the flange section 28, and the inside diameter of the collar section 27 of the seal boot 25 will be somewhat smaller than the outer surface diameter of the neck portion 14 of the trough casing before the seal boot is axially moved over said neck portion. When the collar section 27 is pushed over the neck portion 14 during assembly, the neck portion will be slightly expanded radially, and it will have a frictional sliding fit on said neck portion. Such frictional sliding fit will insure proper sealing engagement of the collar section 27 with the neck portion 14, and it will also permit slight axial movement of the collar section 27 relative to the neck portion 14 in the permanently assembled seal unit. Due to the expansion of the wave spring 23, the thrust ring 24 will be so positioned initially relative to the trough casing 12 that upon insertion of the annular retainer 17 and inward movement of the latter against the bottom wall 16 of the casing, the sealing ring will be engaged by the stop flange 19 and forced a short distance toward the bottom wall 16 of the casing, thereby causing initial tensioning or preloading of the wave spring. While inserting the retainer 17, care must be taken to register the inwardly projecting tongues 22 with the slots in the lugs 20 of the sealing ring 26, and after the retainer 17 has been slid all of the way into the trough casing 12, the edge portion 21 is peened over as indicated in full lines in Fig. 2. When the unit is thus permanently assembled into package form, the sealing ring 26 will bear against the stop flange 19, and the unit will be axially contractible against the resistance of the wave spring 23, and when contracted it will be axially expansible under the pressure of said spring. The component parts of the permanently assembled unit will be positively retained in their cooperative relation to each other, and will not be easily deranged during marketing and during installation at any desired location, as for instance in the hub portion 3 as shown in Fig. 1.

While in the foregoing, the invention has been disclosed in connection with a hydraulic torque converter installation, it will be apparent that the invention lends itself equally well to other types of installations, and it should be understood that it is not intended to limit the invention to the exact details of construction herein disclosed as various modifications within the scope of the appended claims may occur to persons skilled in the art.

It is claimed and desired to secure by Letters Patent:

1. An axially contractible and expansible seal unit of the character set forth comprising, a first ring element having an axially extended neck portion, a second ring element telescopically associated with said first ring element and having an axially recessed portion surrounding said neck portion, an annular flexible sealing member having a collar portion embracing said neck portion and a radial flange portion axially enlarged at its outer periphery, said flange portion bearing axially and radially outwardly against said axially recessed portion of said second ring element, an annular thrust element surrounding said neck portion in axially loose relation to said ring elements and having an axially extended portion at its inner periphery bearing radially outwardly against the inner periphery of said axially enlarged flange portion of said sealing member, and resilient means operatively interposed between said first ring element and said annular thrust element to yieldingly resist axial compression of said seal unit.

2. A seal unit as defined in claim 1 and further characterized by an annular bead portion formed at the free end of and extending radially outwardly from said collar portion of said annular sealing member, and by an annular clamping means tightened around said collar portion of said sealing member between said radial flange portion and said bead portion to urge said collar portion radially into sealing engagement with said neck portion.

3. A seal unit of the character described comprising, an annular trough casing, a sealing ring telescopically mounted within said trough casing and having an axial recess at the side thereof facing the bottom of said trough casing, stop means associated with said trough casing and axially engageable by said sealing ring upon axial outward movement of the latter relative to said trough casing, an annular flexible sealing member within said trough casing having a collar section sealingly embracing the inner wall of the latter and a radial flange section seated in said axial recess of said sealing ring, said flange section having an axially projecting bead portion at the side thereof facing said casing bottom, a thrust ring surrounding said collar section of said annular sealing member in axially loose relation to said casing and sealing ring and having an axially extended portion radially interlocked with said bead portion at the inner periphery of the latter, and spring means reacting between said casing bottom and said thrust ring and effective to urge said thrust ring axially against said bead portion and said sealing ring into axial engagement with said stop means.

4. An axially contractible and expansible seal unit of the character set forth comprising, a first ring element having an axially extended neck portion, a second ring element telescopically associated with said first ring element and surrounding said neck portion, an annular flexible sealing member having a radially inner portion embracing said neck portion and a radially outer portion bearing radially outwardly against an annular overhanging portion of said second ring element, an annular thrust element surrounding said neck portion in axially loose relation to said ring elements and having an axially extended portion bearing radially outwardly against said radially outer portion of said sealing member, and resilient means operatively interposed between said first ring element and said annular thrust element to yieldingly resist axial contraction of said seal unit.

FREDERICK A. SCHICK.

REFERENCES CITED

The following references are of record in the file of this patent:

UNITED STATES PATENTS

| Number | Name | Date |
| --- | --- | --- |
| 1,931,724 | Fageol et al. | Oct. 24, 1933 |
| 2,076,716 | Fretter | Apr. 13, 1937 |
| 2,089,773 | Vedovell et al. | Aug. 10, 1937 |
| 2,308,114 | Schjolin | Jan. 12, 1943 |
| 2,322,834 | Dornhofer | June 29, 1943 |
| 2,347,118 | Matter | Apr. 18, 1944 |